(12) United States Patent
Chen (10) Patent No.: US 9,195,792 B2
(45) Date of Patent: Nov. 24, 2015

(54) CIRCUIT DESIGN PORTING BETWEEN PROCESS DESIGN TYPES

(71) Applicant: Taiwan Semiconductor Manufacturing Company Limited, Hsin-Chu (TW)

(72) Inventor: Wei Chih Chen, Hsinchu (TW)

(73) Assignee: Taiwan Semiconductor Manufacturing Company Limited, Hsin-Chu (TW)

( * ) Notice: Subject to any disclaimer, the term of this patent is extended or adjusted under 35 U.S.C. 154(b) by 119 days.

(21) Appl. No.: 14/069,245

(22) Filed: Oct. 31, 2013

(65) Prior Publication Data
US 2015/0121322 A1  Apr. 30, 2015

(51) Int. Cl.
G06F 7/50 (2006.01)
G06F 17/50 (2006.01)

(52) U.S. Cl.
CPC ........ G06F 17/5072 (2013.01); G06F 17/5063 (2013.01)

(58) Field of Classification Search
CPC ............ G06F 17/5063; G06F 17/5072; G06F 17/5081
USPC ......................................................... 716/103
See application file for complete search history.

(56) References Cited

U.S. PATENT DOCUMENTS

| | | | |
|---|---|---|---|
| 7,418,683 B1 * | 8/2008 | Sonnard et al. | 716/122 |
| 2007/0030550 A1 * | 2/2007 | Shiraishi | 359/208 |
| 2008/0134109 A1 * | 6/2008 | Hammouda et al. | 716/3 |
| 2008/0282212 A1 * | 11/2008 | Dennison et al. | 716/10 |

* cited by examiner

*Primary Examiner* — Suchin Parihar
(74) *Attorney, Agent, or Firm* — Cooper Legal Group, LLC (57) ABSTRACT

Among other things, one or more systems and techniques for porting a circuit design from a first process design type to a second process design type are provided. A circuit design comprises one or more components, such as transistors, that are arranged and sized according to a first process design type, such as a 90 nm processing environment. The circuit design is partitioned into one or more topology categories such as a current mirror topology category or a differential pair topology category. Ordered sets of parameters are determined for respective topology categories. The components within the circuit design are resized based upon the one or more topology categories to generate a ported circuit design specified for the second process design type, such as a 50 nm processing environment.

20 Claims, 10 Drawing Sheets

CIRCUIT DESIGN LAYOUT DIMENSION ESTIMATION

- CHANNEL LENGTH: 120
- CHANNEL WIDTH: 586
- PO-PO SPACE: 118
- OD-OD HORIZONTAL: 470
- OD-OD VERTICAL: 758
- TOTAL UNITS: 20
- TOTAL AREA: 333.05
- PO DENSITY: 0.2242
- OD DENSITY: 0.355
- ...

CIRCUIT DESIGN PORTING BETWEEN PROCESS DESIGN TYPES

BACKGROUND

A circuit design generally models a layout of a circuit having one or more devices, such as one or more transistors, OPAMPS, current-mode logic blocks, analog devices, cascade current mirrors, etc. Such devices are placed and sized within the circuit design according to various circuit topology properties or device parameters, such as channel widths, channel lengths, poly-to-poly spacing, poly density, or a variety of other parameters or constraints. The circuit design is generated according a process design type, such as a 90 nm processing environment.

DETAILED DESCRIPTION

The claimed subject matter is now described with reference to the drawings, wherein like reference numerals are generally used to refer to like elements throughout. In the following description, for purposes of explanation, numerous specific details are set forth in order to provide an understanding of the claimed subject matter. It is evident, however, that the claimed subject matter can be practiced without these specific details. In other instances, structures and devices are illustrated in block diagram form in order to facilitate describing the claimed subject matter.

One or more systems and techniques for porting a circuit design from a first process design type to a second process design type are provided herein. A circuit design, such as an analog circuit comprising one or more components such as transistors, OPAMPS, current mode logic (CML), cascade current mirrors, etc., is designed according to a first process design type, such as a 90 nm processing environment. Structures of such components within the circuit design are placed and sized according to design constraints, size constraints, spacing constraint, or other design rules for the first process design type. The circuit design is ported from the first design process type to a second design process type, such as a 50 nm processing environment. However, satisfaction of the design rules for the first process design type does not guarantee that the circuit design will satisfy design rules for the second process design type. Accordingly, as provided herein, the circuit design is efficiently ported from the first process design type to the second design type such that transistor dimension resizing, performance analysis, area estimation, and generation of a new design and layout is straightforward and automated.

Figure 1:
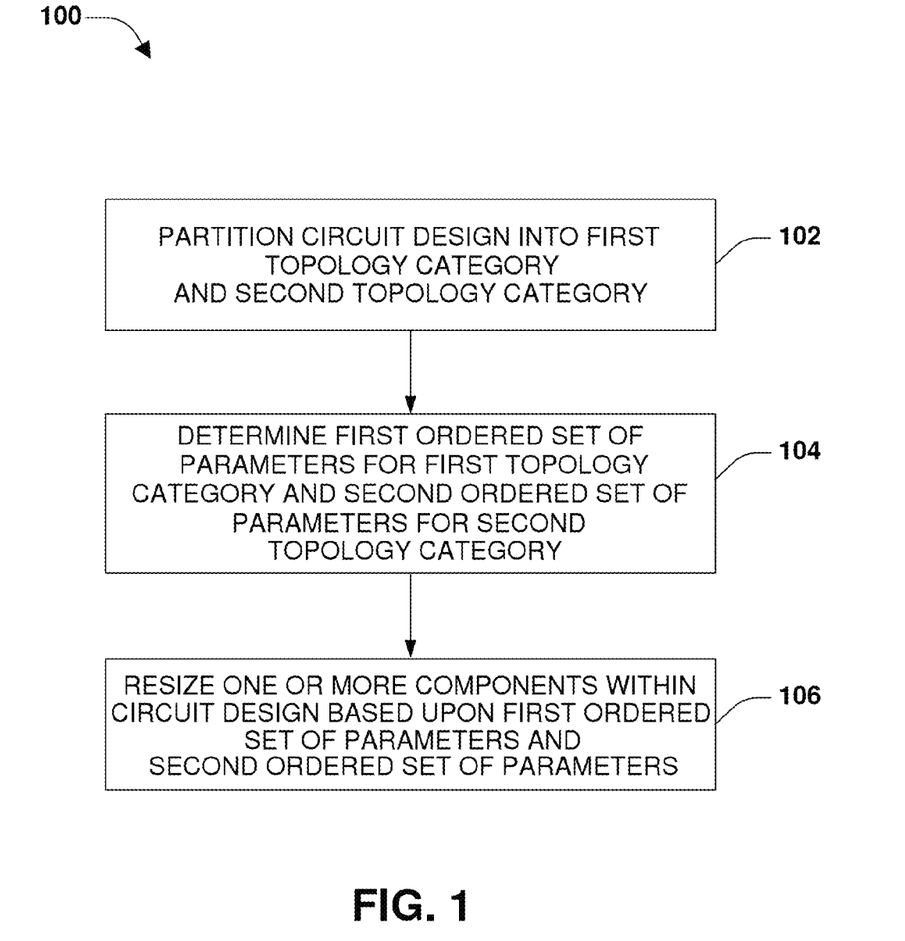
FIG. 1 is a flow diagram illustrating a method of porting a circuit design from a first process design type to a second process design type, according to some embodiments.
Figure 2:
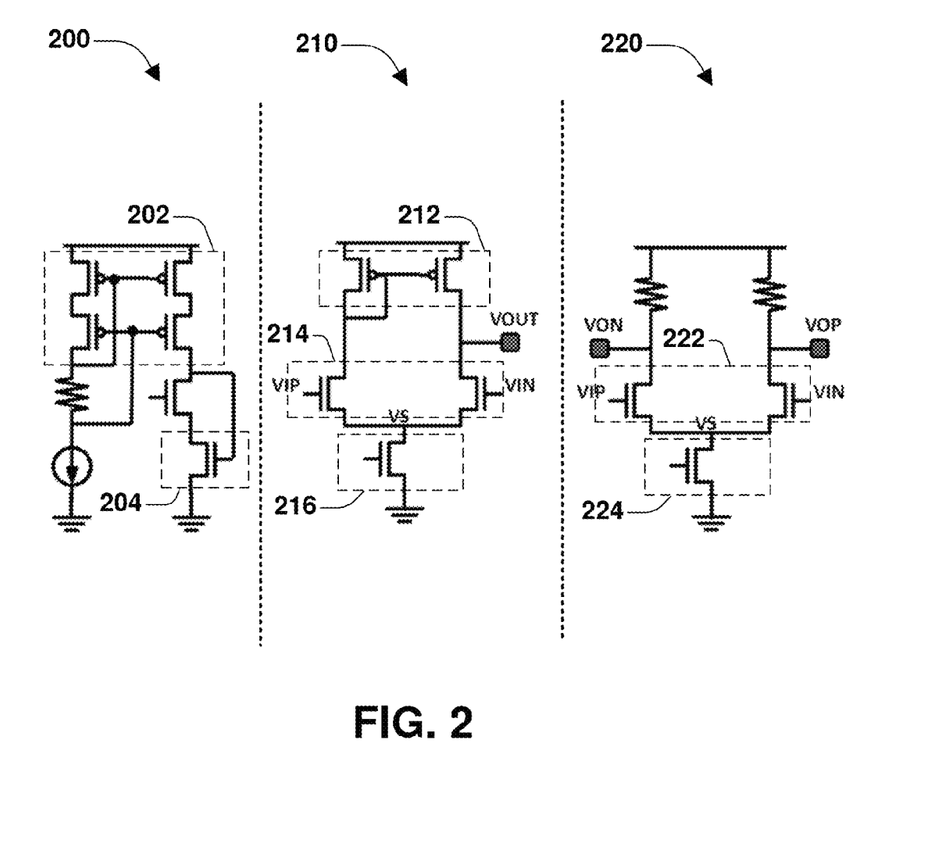
FIG. 2 is an illustration of one or more topology categories used to construct analog circuit structures, according to some embodiments.

A method 100 of porting a circuit design from a first process design type to a second process design type is illustrated in FIG. 1. The circuit design is specified according to the first process design type. Components within the circuit design are placed, sized, or connected according to design rules for the first process design type. At 102, the circuit design is partitioned into one or more topology categories, such as a first topology category, a second topology category, or any other number or type of topology categories. In an embodiment, the first topology category comprises a current mirror topology and the second topology category comprises a differential pair topology. FIG. 2 illustrates one or more topology categories used to construct analog circuit structures. A cascade current mirror structure 200 is constructed of a first structure 202 formed according to the current mirror topology and a second structure 204 formed according to the current mirror topology. An OPAMP structure 210 is constructed of a first structure 212 formed according to the current mirror topology, a second structure 214 formed according to the differential pair topology, and a third structure 216 formed according to the current mirror topology. A current mode logic (CML) structure 220 is constructed of a first structure 222 formed according to the differential pair topology and a second structure 224 formed according to the current mirror topology.

At 104, a first ordered set of parameters for the first topology category and a second ordered set of parameters for the second topology category are determined. In an embodiment, one or more parameters are identified for the first topology category, such as an Rout parameter or a voltage threshold (Vth) parameter for inclusion within a current mirror topology category. In an embodiment, one or more parameters are identified for the second topology category, such as a voltage threshold (Vth) parameter, a transconductance (gm) parameter, or a current on to current off ratio (Ion/Ioff) parameter for inclusion within a differential pair topology category.

Circuit topology behavior of the first topology category is simulated to identify first performance characteristics for the first ordered set of parameters. In an embodiment, an Rout parameter for the current mirror topology category is simulated utilizing a linear regression model and a device parameter lambda to determine a channel length for the current mirror topology category or a first performance characteristic for the channel length. Circuit topology behavior of the second topology category is simulated to identify second performance characteristics for the second ordered set of parameters.

The first ordered set of parameters is normalized based upon the first performance characteristics and the second ordered set of parameters is normalized based upon the second performance characteristics. A normalized parameter corresponds to a new parameter value, such as a new channel length having a new performance value, associated with the second process design type that satisfies an older parameter value associated with the first process design type, such as an old channel length having an old performance value. In an embodiment, if the old channel length of the first process design type has a performance value of 7.47, then the new channel length is selected as the normalized parameter such that the normalized parameter has a performance value of 7.47 or greater.

Parameters within the first ordered set of parameters and parameters within the second ordered set of parameters are ranked and ordered according to various criteria, such as a dimension ranking criteria. In an embodiment, a voltage threshold (Vth) parameter is ranked based upon a headroom criteria, an Rout parameter is ranked based upon an Id to Vds sensitivity criteria, a transconductance parameter is ranked based upon a voltage gain to current criteria, a current on to current off ratio (Ion/Ioff) parameter is ranked based upon an output swing degradation criteria, etc. In an embodiment where the first topology category comprises a current mirror topology category, an Rout parameter is ordered before a voltage threshold (Vth) parameter within the first ordered set of parameters based upon the Rout parameter having a higher ranking than the voltage threshold (Vth) parameter for the current mirror topology category. In an embodiment where the second topology category comprises a differential pair topology category, a voltage threshold (Vth) parameter is ordered before a transconductance parameter within the second ordered set of parameters based upon the voltage threshold (Vth) parameter having a higher ranking than the transconductance parameter for the differential pair topology category. The transconductance parameter is ordered before a current on to current off ratio (Ion/Ioff) parameter based upon the transconductance parameter having a higher ranking than the Ion/Ioff parameter for the differential pair topology category.

At 106, one or more components, such as transistors, within the circuit design are resized based upon the first ordered set of parameters and the second ordered set of parameters to generate a ported circuit design specified according to the second design process type for the circuit design. In an embodiment where the first topology category comprises a current mirror topology category, an initial channel length selection is identified for a first component, such as a first transistor, based upon a first parameter within the first ordered set of parameters. In an embodiment, a channel length of 3 is selected based upon an Rout parameter because the channel length of 3 provides a performance value equal to or greater than a performance value of an old channel length of 10 used for the first process design type (e.g., FIG. 5). The initial channel length selection is refined based upon a second parameter within the first ordered set of parameters. In an embodiment, a channel length of 5 is selected based upon a voltage threshold (Vth) parameter because the channel length of 5 is below a saturation threshold specified by the voltage threshold (Vth) parameter. A channel width is determined for the first component utilizing a current square law technique and the channel length. In this way, channel lengths, channel widths, or other device parameters are determined for resizing transistors within the ported circuit design for the second process design type.

In an embodiment where the second topology category comprises a differential pair topology category, a first initial channel size parameter selection is identified for a second component, such as a channel length or width for a second transistor, based upon a voltage threshold (Vth) parameter within the second ordered set of parameters. The first initial channel size parameter selection is refined based upon a transconductance (gm) parameter within the second ordered set of parameters to create a second initial channel size parameter selection. The second initial channel size parameter selection is refined based upon a current on to current off ration (Ion/Ioff) parameter within the second ordered set of parameters to determine a channel size parameter for utilization in the ported circuit design. In this way, channel size parameters are determined for resizing transistors within the ported circuit design for the second process design type.

Figure 3A:
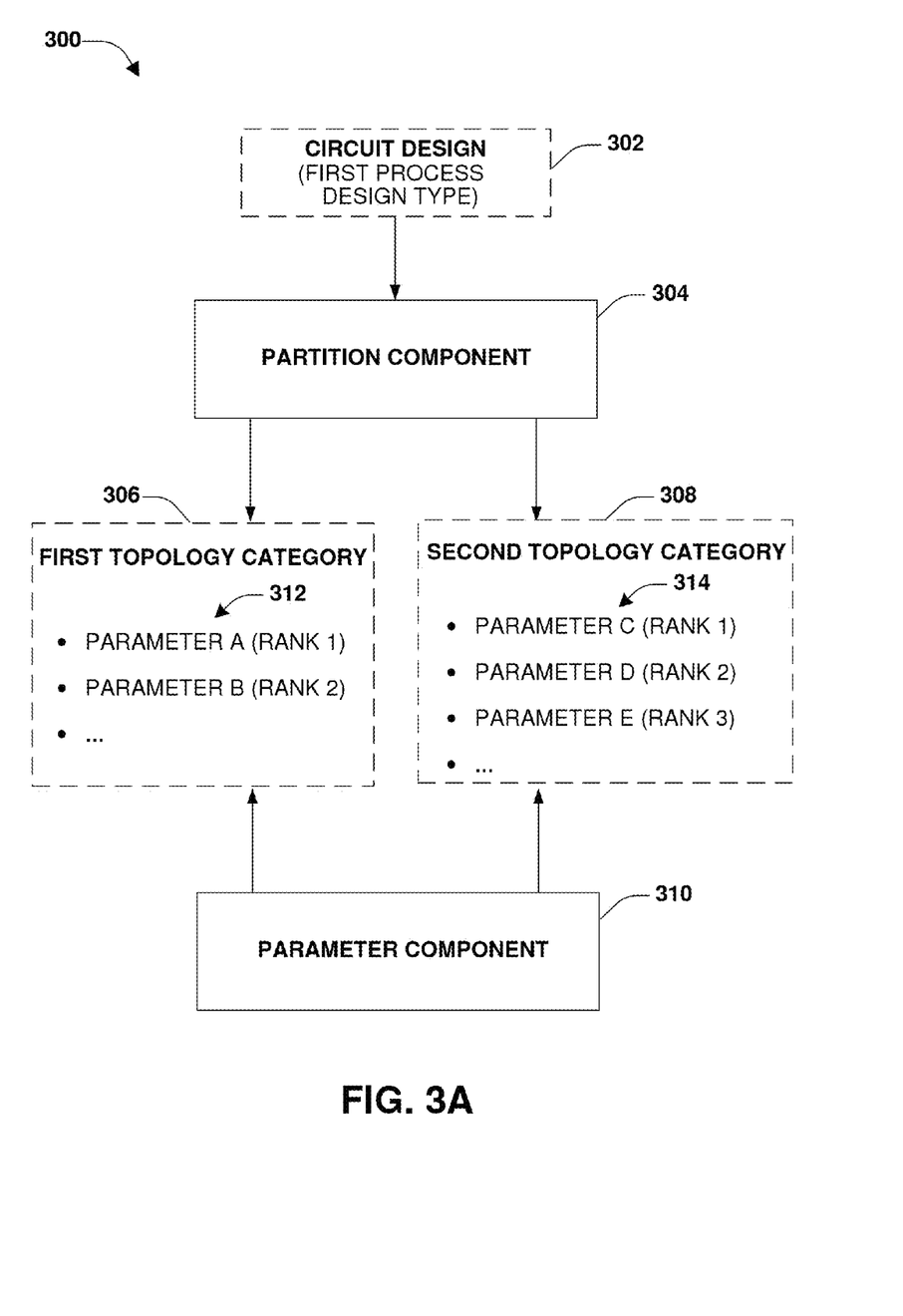
FIG. 3A is an illustration of a system for partitioning a circuit design, according to some embodiments.

FIG. 3A illustrates a system 300 for partitioning a circuit design 302. The circuit design 302 is specified according to a first process design type, such as a 90 nm processing environment. The system 300 comprises a partition component 304. The partition component 304 is configured to partition the circuit design 302 into one or more topology categories. In an embodiment, the partition component 304 partitions the circuit design 302 into a first topology category 306 and a second topology category 308. The system 300 comprises a parameter component 310. The parameter component 310 is configured to simulate circuit topology behavior of the first topology category 306 to determine a first set of ordered parameters 312. The parameter component 310 is configured to simulate circuit topology behavior of the second topology category 308 to determine a first set of ordered parameters 314. It is appreciated that any number or type of topology categories can be identified for the circuit design 302.

Figure 3B:
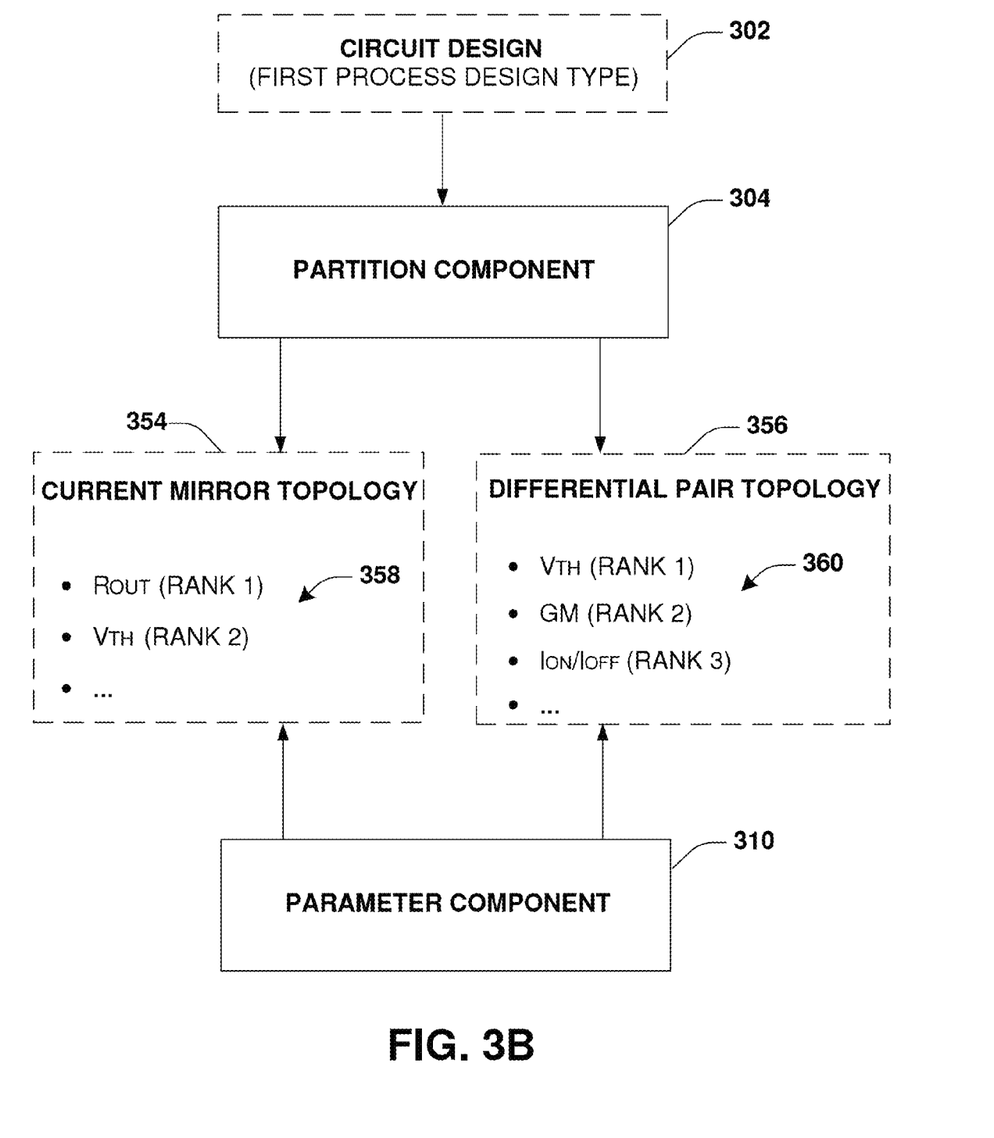
FIG. 3B is an illustration of partitioning a circuit design into a current mirror topology category and a differential pair topology category, according to some embodiments.

FIG. 3B illustrates an embodiment of the partition component 304 partitioning the circuit design 302 into a current mirror topology category 354 and a differential pair topology category 356. The parameter component 310 is configured to simulate circuit topology behavior for the current mirror topology 354 to determine a first ordered set of parameters 358, such as an Rout parameter having a ranking higher than a ranking of a voltage threshold (Vth) parameter. The parameter component 310 is configured to simulate circuit topology behavior for the current mirror topology 354 to determine a first ordered set of parameters 358, such as an Rout parameter having a ranking of 1 that is higher than a ranking 2 for a voltage threshold (Vth) parameter. The parameter component 310 is configured to simulate circuit topology behavior for the differential pair topology 356 to determine a second ordered set of parameters 358, such a voltage threshold (Vth) parameter having a ranking of 1, a transconductance (gm) parameter having a ranking of 2, and a current on to current off ratio (Ion/Ioff) parameter having a ranking of 3. In this way, the circuit design 302 is partitioned, and parameters are specified and ranked for respective partitions.

In an embodiment where a component for the differential pair topology 356 comprises an OPAMP, the parameter component 310 determines an ordered set of parameters for the OPAMP to comprise the voltage threshold (Vth) parameter and the transconductance (gm) parameter. In an embodiment where a component for the differential pair topology 356 comprises a current logic mode (CML), the parameter component 310 determines an ordered set of parameters for the CML to comprise the voltage threshold (Vth) parameter and the current on to current off ratio (Ion/Ioff) parameter.

Figure 4:
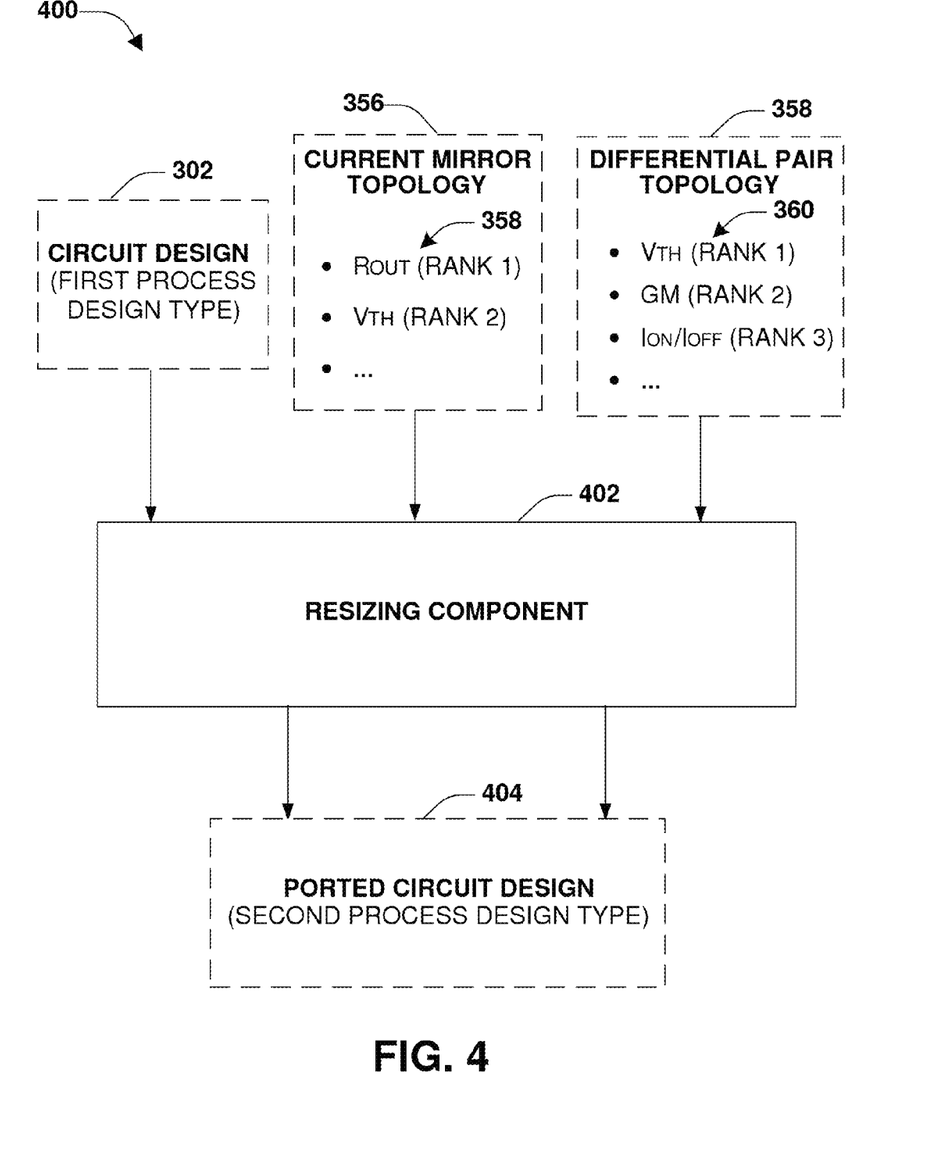
FIG. 4 is an illustration of a system for porting a circuit design from a first process design type to a second process design type as a ported circuit design, according to some embodiments.

FIG. 4 illustrates a system 400 for porting a circuit design 302 from a first process design type to a second process design type as a ported circuit design 404. The system 400 comprises a resizing component 402. The resizing component 402 is configured to resize one or more components within the circuit design 302 based upon a first ordered set of parameters, such as a first ordered set of parameters 358 for a current mirror topology 356, and a second ordered set of parameters, such as a second ordered set of parameters 360 for a differential pair topology 358. It is appreciated that the resizing component can evaluate any number or type of topology categories for the circuit design 302. In this way, the resizing component 402 resizes or places components, such as transistors, within the circuit design 302 to create the ported circuit design 404 satisfying design constraints, performance objectives, or design rules for the second process design type (e.g., FIG. 7), such as a 50 nm process environment.

Figure 5:
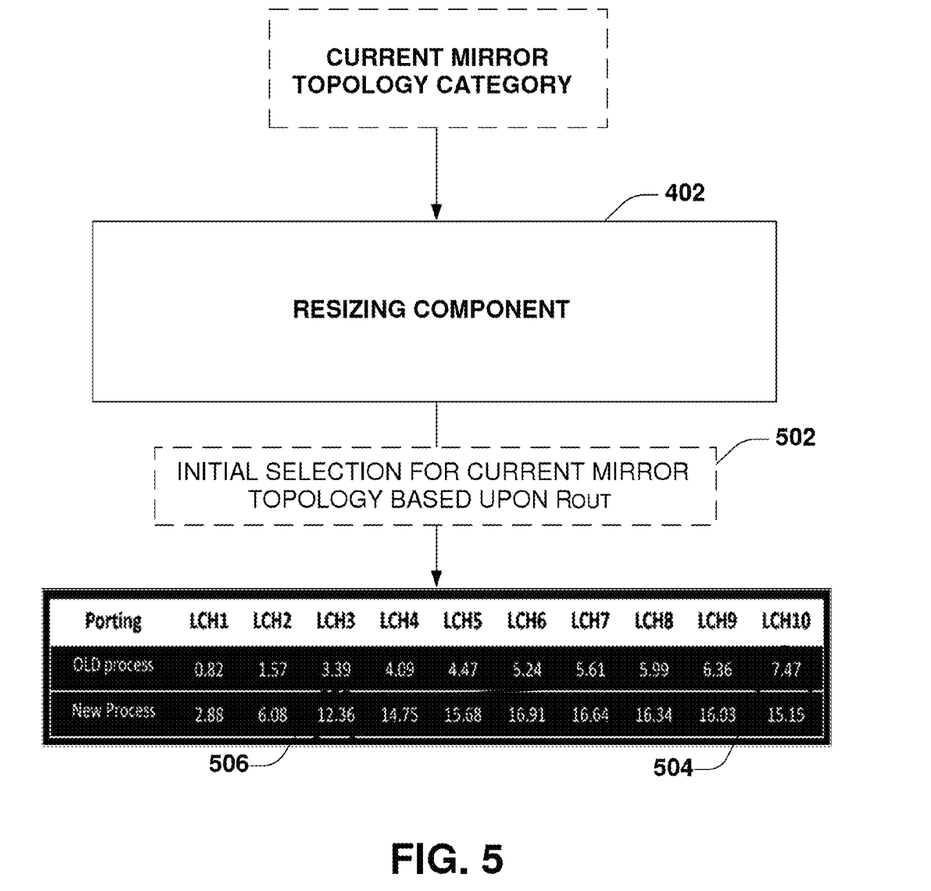
FIG. 5 is an illustration of identifying an initial channel length selection, according to some embodiments.
Figure 6:
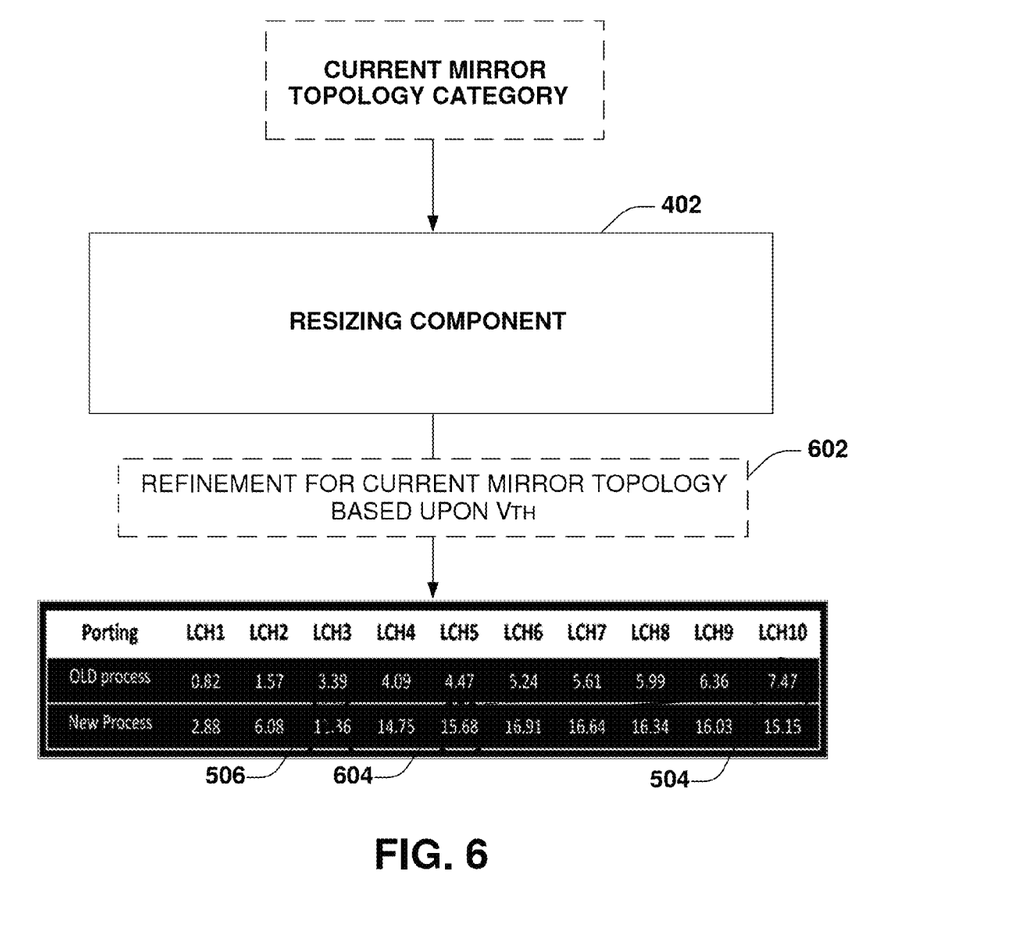
FIG. 6 is an illustration of refining an initial channel length selection, according to some embodiments.

FIGS. 5 and 6 illustrate an embodiment of the resizing component 402 identifying a channel length for a circuit design based upon a first set of ordered parameters for a current mirror topology category. The resizing component 402 identifies 502 an initial selection of a channel length for a component, such as a transistor, of the current mirror topology category based upon an Rout parameter, as illustrated in FIG. 5. In an embodiment, the resizing component 402 determines that the first process design type of the circuit design 302 has an old channel length 504 of 10 that results in a performance metric of 7.47. The resizing component 402 identifies an initial channel length selection 506 comprising a channel length of 3 based upon the initial channel length selection 506 resulting in a performance metric, such as 12.36, that is equal to or greater than the performance metric of the old channel length 10. In this way, an initial channel length selection 506 is identified based upon the Rout parameter for the current mirror topology category, as illustrated in FIG. 5.

The resizing component 402 refines 602 the initial channel length selection 506 based upon a voltage threshold (Vth) parameter that takes into account saturation, such as corner to corner variation saturation, as illustrated in FIG. 6. In an embodiment, the refinement is performed to decrease voltage threshold variation between corners of a component, while maintaining a relatively small channel length. In an embodiment, the resizing component 402 refines 602 the initial channel length selection 506 to determine a channel length 604 for utilization in the ported circuit design 404. In this way, component resizing or placement is performed to generate the ported circuit design 404 specified for the second process design type, as illustrated in FIG. 6.

Figure 7:
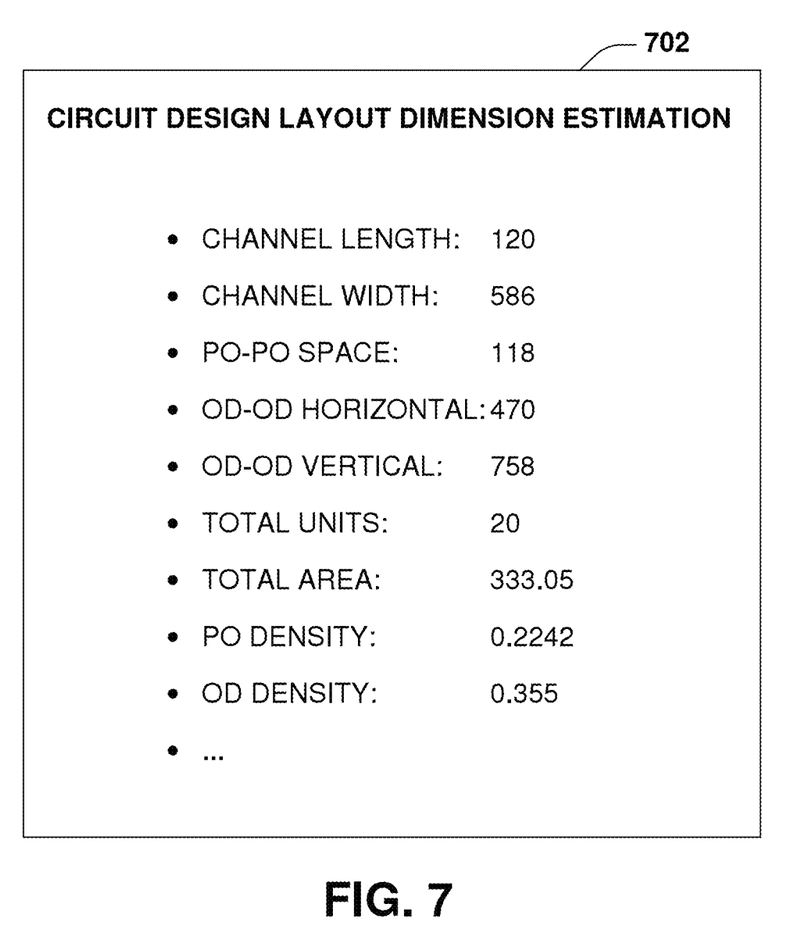
FIG. 7 is an illustration of a circuit design layout dimension estimation for a ported circuit design of a circuit design, according to some embodiments.

FIG. 7 illustrates a circuit design layout dimension estimation 702 for the ported circuit design 404 of the circuit design 302. The circuit design layout dimension estimation 702 comprises a variety of information about the ported circuit design 404 that is used for design dimension and layout rule compliance for the second process design type. In an embodiment, the ported circuit design 404 has a channel length of 120, a channel width of 586, poly-to-poly spacing of 118, OD-to-OD horizontal spacing of 470, OD-to-OD vertical spacing of 758, 20 units/components, a total area of 333.05, a poly density of 0.2242, an OD density of 0.355, or a variety of other information that relate to design sizing and layout information of the ported circuit design 404 for the second process design type.

Figure 8:
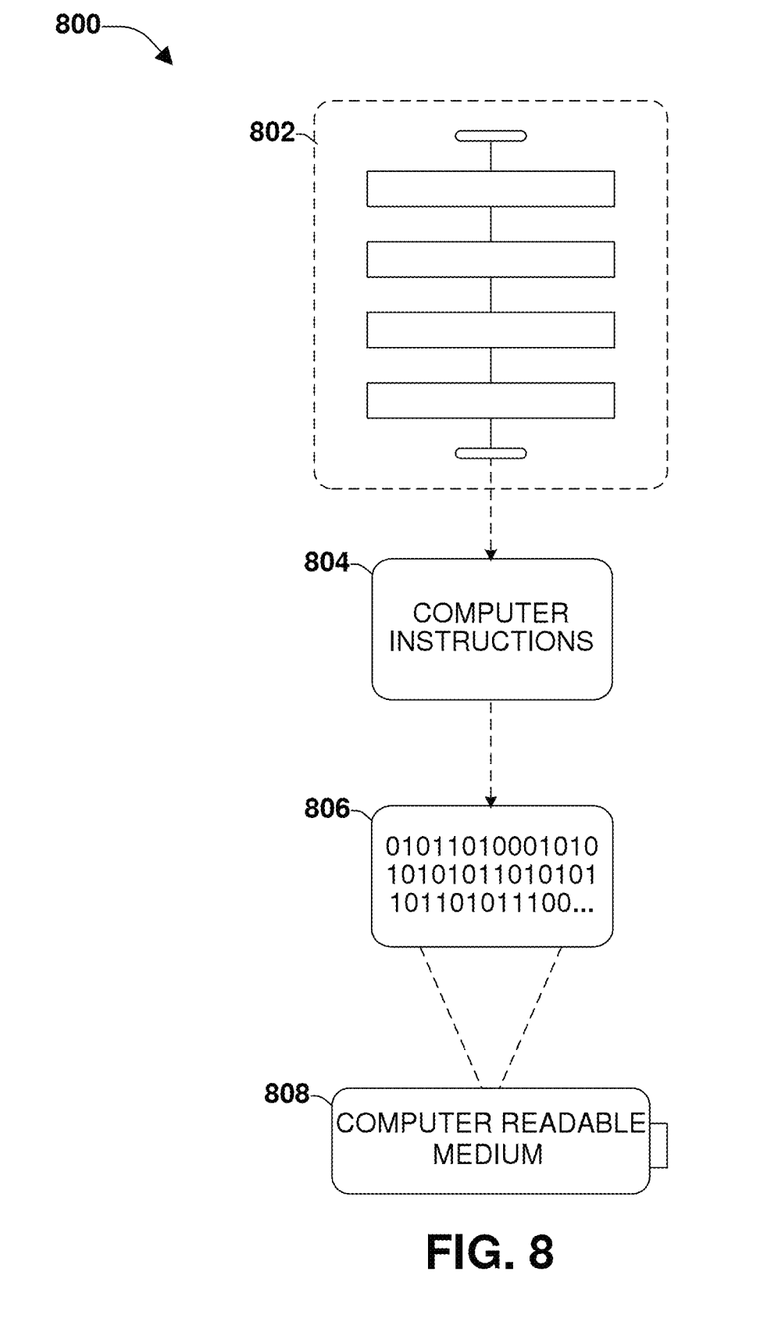
FIG. 8 is an illustration of an example computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium is illustrated in FIG. 8, wherein the implementation 800 comprises a computer-readable medium 808 (e.g., a CD-R, DVD-R, flash drive, a platter of a hard disk drive, etc.), on which is encoded computer-readable data 806. This computer-readable data 806 in turn comprises a set of computer instructions 804 configured to operate according to one or more of the principles set forth herein. In one such embodiment 800, the processor-executable computer instructions 804 may be configured to perform a method 802, such as at least some of the exemplary method 100 of FIG. 1, for example. In another such embodiment, the processor-executable instructions 812 may be configured to implement a system, such as at least some of the exemplary system 300 of FIG. 3A and/or at least some of the exemplary system 400 of FIG. 4, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 9:
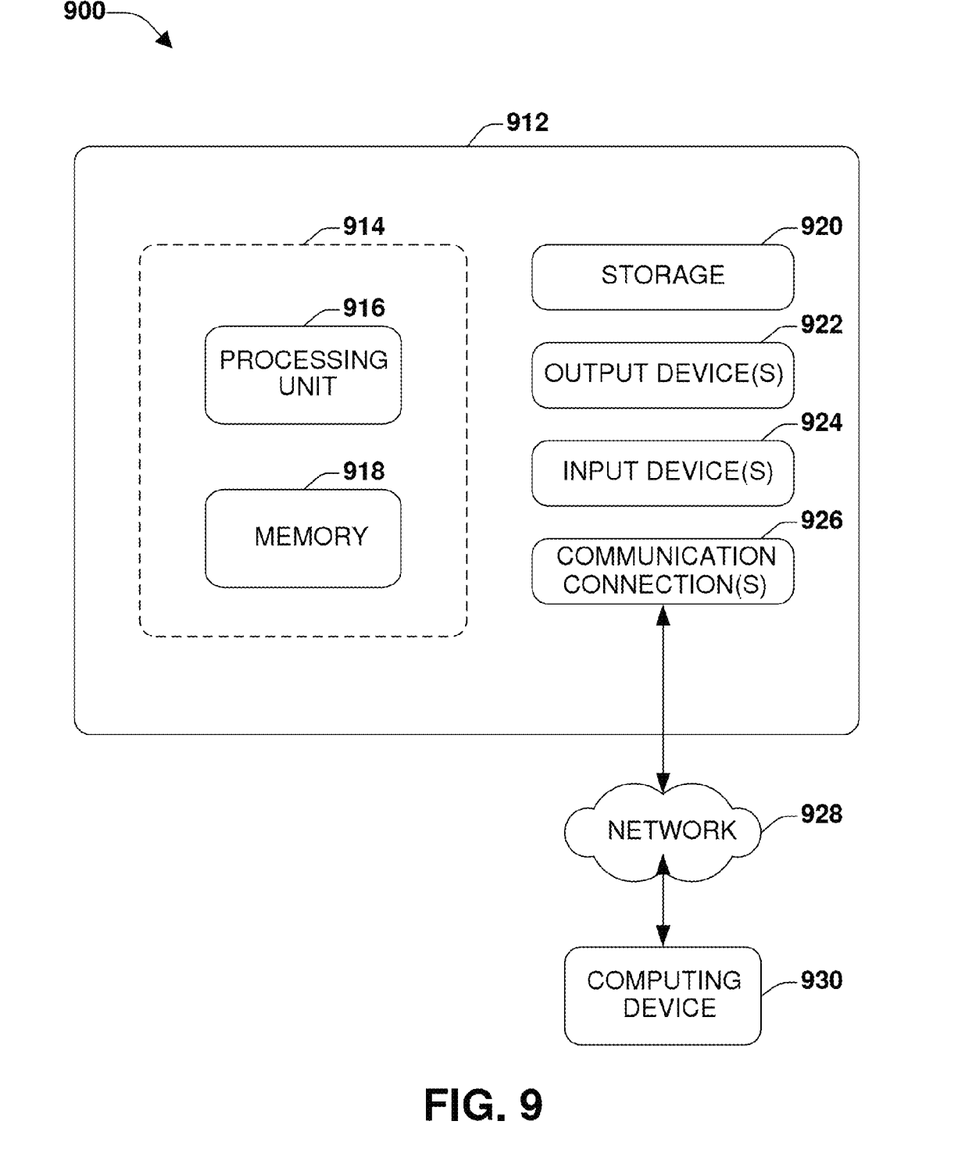
FIG. 9 illustrates an example computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 900 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In some embodiments, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In some embodiments, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via a network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

According to an aspect of the instant disclosure, a method for porting a circuit design from a first process design type to a second process design type is provided. The method comprises partitioning a circuit design into a first topology category and a second topology category. The circuit design is specified according to a first process design type. A first ordered set of parameters is determined for the first topology category and a second ordered set of parameters is determined for the second topology category. One or more components within the circuit design are resized based upon the first ordered set of parameters and the second ordered set of parameters to generate a ported circuit design specified according to a second process design type for the circuit design.

According to an aspect of the instant disclosure, a method for porting a circuit design from a first process design type to a second process design type is provided. The method comprises partitioning an analog circuit design into a current mirror topology category and a differential pair topology category. The circuit design is specified according to a first process design type. A first ordered set of parameters is determined for the current mirror topology category and a second ordered set of parameters is determined for the differential pair topology category. One or more components within the circuit design are resized based upon the first ordered set of parameters and the second ordered set of parameters to generate a ported circuit design specified according to a second process design type for the analog circuit design.

According to an aspect of the instant disclosure, a system for porting a circuit design from a first process design type to a second process design type is provided. The system comprises a partition component configured to partition a circuit design into a first topology category and a second topology category. The circuit design is specified according to a first process design type. The system comprises a parameter component configured to simulate circuit topology behavior of the first topology category to determine a first ordered set of parameters. The parameter component is configured to simulate circuit topology behavior of the second topology category to determine a second ordered set of parameters. The system comprises a resizing component configured to resize one or more components within the circuit design based upon the first ordered set of parameters and the second ordered set of parameters to generate a ported circuit design specified according to a second process design type for the circuit design.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally to be construed to mean "one or more" unless specified otherwise or clear from context to be directed to a singular form. Also, at least one of A and B or the like generally means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
   partitioning a circuit design into a first topology category and a second topology category, the circuit design specified according to a first process design type;
   determining a first ordered set of parameters for the first topology category and a second ordered set of parameters for the second topology category;
   simulating circuit topology behavior of the first topology category to identify first performance characteristics for the first ordered set of parameters;
   normalizing the first ordered set of parameters based upon the first performance characteristics, a normalized parameter corresponding to a new parameter value of a second process design type satisfying an older parameter value of the first process design type; and
   resizing one or more components within the circuit design based upon the first ordered set of parameters and the second ordered set of parameters to generate a ported circuit design specified according to the second process design type for the circuit design, the method implemented at least in part via a processing unit.

2. The method of claim 1, the determining a first ordered set of parameters comprising:
   identifying a first set of parameters for the first topology category; and
   ordering respective parameters within the first set of parameters based upon dimension ranking criteria to determine the first ordered set of parameters.

3. The method of claim 1, the first topology category comprising at least one of a current mirror topology or a differential pair topology.

4. The method of claim 1, the first topology category comprising a current mirror topology, the method comprising:
   identifying at least one of an Rout parameter or a voltage threshold (Vth) parameter for inclusion within the first topology category.

5. The method of claim 4, the determining a first ordered set of parameters comprising:
   ordering the Rout parameter before the Vth parameter within the first ordered set of parameters based upon the Rout parameter having a higher ranking than the Vth parameter for the current mirror topology.

6. The method of claim 1, the first topology category comprising a differential pair topology, the method comprising:
   identifying at least one of a voltage threshold (Vth) parameter, a transconductance parameter, or a current on to current off ratio (Ion/Ioff) parameter for inclusion within the first topology category.

7. The method of claim 6, the determining a first ordered set of parameters comprising:
   ordering the Vth parameter before the transconductance parameter within the second ordered set of parameters based upon the Vth parameter having a higher ranking than the transconductance parameter for the differential pair topology.

8. The method of claim 6, the determining a first ordered set of parameters comprising:
   ordering the transconductance parameter before the Ion/Ioff parameter within the second ordered set of parameters based upon the transconductance parameter having a higher ranking than the Ion/Ioff parameter for the differential pair topology.

9. The method of claim 1, the determining a first ordered set of parameters comprising at least one of:
   ranking a voltage threshold (Vth) parameter based upon a headroom criteria;
   ranking an Rout parameter based upon an Id to Vds sensitivity criteria;
   ranking a transconductance parameter based upon a voltage gain to current criteria; or
   ranking a current on to current off ratio (Ion/Ioff) parameter based upon an output swing degradation criteria.

10. The method of claim 1, the resizing one or more components comprising:
    identifying an initial channel length selection for a first component based upon a first parameter within the first ordered set of parameters; and
    refining the initial channel length selection for the first component based upon a second parameter within the first ordered set of parameters to determine a channel length for utilization in the ported circuit design.

11. The method of claim 1, a first parameter ordered before a second parameter within the first ordered set of parameters.

12. The method of claim 10, comprising:
determining a channel width for the first component based upon the channel length utilizing a current square law technique.

13. The method of claim 1, the resizing one or more components comprising:
identifying a first initial channel size parameter selection for a first component based upon a voltage threshold (Vth) parameter within the first ordered set of parameters;
refining the first initial channel size parameter selection based upon a transconductance parameter within the first ordered set of parameters to create a second initial channel size parameter selection; and
refining the second initial channel size parameter selection based upon a current on to current off ratio (Ion/Ioff) parameter within the first ordered set of parameters to determine a channel size parameter for utilization in the ported circuit design.

14. A method, comprising:
partitioning circuit design into a first topology category and a second topology category, the circuit design specified according to a first process design type;
determining a first ordered set of parameters for the first topology category and a second ordered set of parameters for the second topology category, comprising:
identifying a first set of parameters for the first topology category; and
ordering respective parameters within the first set of parameters based upon dimension ranking criteria to determine the first ordered set of parameters; and
resizing one or more components within the circuit design based upon the first ordered set of parameters and the second ordered set of parameters to generate a ported circuit design specified according to a second process design type for the circuit design, the method implemented at least in part via a processing unit.

15. The method of claim 14, the circuit design comprising at least one of a cascade current mirror, an OPAMP, or a current mode logic (CML).

16. The method of claim 14, comprising:
simulating circuit topology behavior of the first topology category to identify first performance characteristics for the first ordered set of parameters; and
normalizing the first ordered set of parameters based upon the first performance characteristics, a normalized parameter corresponding to a new parameter value of a second process design type satisfying an older parameter value of the first process design type.

17. The method of claim 14, the resizing one or more components comprising:
identifying an initial channel length selection for a first component based upon a first parameter within the first ordered set of parameters; and
refining the initial channel length selection for the first component based upon a second parameter within the first ordered set of parameters to determine a channel length for utilization in the ported circuit design.

18. A system, comprising:
a partition component configured to:
partition a circuit design into a first topology category and a second topology category, the circuit design specified according to a first process design type;
a parameter component configured to:
determine a first ordered set of parameters for the first topology category and a second ordered set of parameters for the second topology category; and
a resizing component configured to:
resize one or more components within the circuit design based upon the first ordered set of parameters and the second ordered set of parameters to generate a ported circuit design specified according to a second process design type for the circuit design, wherein resizing the one or more components comprises:
identifying an initial channel length selection for a first component based upon a first parameter within the first ordered set of parameters; and
refining the initial channel length selection for the first component based upon a second parameter within the first ordered set of parameters to determine a channel length for utilization in the ported circuit design.

19. The system of claim 18, the first topology category comprising a current mirror topology, and the partition component configured to:
identify at least one of an Rout parameter or a voltage threshold (Vth) parameter for inclusion within the first topology category.

20. The system of claim 18, the first topology category comprising a differential pair topology, the partition component configured to:
identify at least one of a voltage threshold (Vth) parameter, a transconductance parameter, or a current on to current off ratio (Ion/Ioff) parameter for inclusion within the first topology category.

* * * * *